United States Patent
Mizutani et al.

(10) Patent No.: US 6,174,432 B1
(45) Date of Patent: Jan. 16, 2001

(54) HYDROTREATING CATALYST FOR HEAVY HYDROCARBON OIL, PROCESS FOR PRODUCING THE CATALYST, AND HYDROTREATING METHOD USING THE SAME

(75) Inventors: Yoshihiro Mizutani; Keizou Nagata, both of Saitama; Yukio Shibata, Kanagawa; Yasuo Yamamoto, Saitama, all of (JP)

(73) Assignees: Petroeum Energy Center; Cosmo Oil Co., Ltd., both of Tokyo (JP)

(*) Notice: Under 35 U.S.C. 154(b), the term of this patent shall be extended for 0 days.

(21) Appl. No.: 09/331,244

(22) PCT Filed: Dec. 10, 1997

(86) PCT No.: PCT/JP97/04552
§ 371 Date: Jun. 17, 1999
§ 102(e) Date: Jun. 17, 1999

(87) PCT Pub. No.: WO98/26866
PCT Pub. Date: Jun. 25, 1998

(30) Foreign Application Priority Data

Dec. 18, 1995 (JP) .................................................. 8-353795
Oct. 6, 1997 (JP) .................................................. 9-287612

(51) Int. Cl.[7] ............................. C10G 45/04; B01T 21/04
(52) U.S. Cl. .................................. 208/216 PP; 208/108; 208/143; 502/204
(58) Field of Search ............................. 208/143, 216 PP, 208/243, 108; 502/204

(56) References Cited

U.S. PATENT DOCUMENTS

| | | | |
|---|---|---|---|
| 5,229,347 | * 7/1993 | Prada et al. | 502/221 |
| 5,494,875 | 2/1996 | Usui et al. | 502/206 |

FOREIGN PATENT DOCUMENTS

| | | | |
|---|---|---|---|
| 5-93190 | 4/1993 | (JP) | C10G/45/04 |
| 6-226102 | 8/1994 | (JP) | B01J/23/85 |
| 6-319994 | 11/1994 | (JP) | B01J/21/04 |

OTHER PUBLICATIONS

International Search Report.
European Search Report.

* cited by examiner

*Primary Examiner*—Bekir L. Yildirim
(74) *Attorney, Agent, or Firm*—Sughrue, Mion, Zinn, Macpeak, & Seas, PLLC

(57) ABSTRACT

A hydrotreating catalyst for heavy hydrocarbon oil, which comprises a boron-containing alumina carrier containing from 1 to 12 wt %, in terms of an oxide, of boron based on the catalyst, having supported thereon a metal in the Group VI, wherein the catalyst has an average pore size of from 19 to 25 nm, a pore volume of from 0.65 to 0.8 ml/g, a catalyst strength of 3 lb/mm or more, and a specific surface area of from 70 to 130 m$^2$/g; a process for producing the hydrotreating catalyst; and a method for hydrotreating heavy hydrocarbon oil, which comprises conducting a catalytic reaction of heavy hydrocarbon oil in the presence of the catalyst composition at a temperature of from 300 to 500° C., a pressure of from 3 to 20 MPa, a hydrogen/oil ratio of from 400 to 3000 Nl/l, and LHSV of from 0.1 to 1.5 hr$^{-1}$.

5 Claims, 1 Drawing Sheet

HYDROTREATING CATALYST FOR HEAVY HYDROCARBON OIL, PROCESS FOR PRODUCING THE CATALYST, AND HYDROTREATING METHOD USING THE SAME

TECHNICAL FIELD

The present invention relates to a hydrotreating catalyst for heavy hydrocarbon oil; it's preparation process; and a hydrotreating method using the catalyst. More particularly, the present invention relates to a hydrotreating catalyst for heavy hydrocarbon oil comprising sulfur, asphaltene and a heavy metal, such as nickel, vanadium, and the like; a process for producing the catalyst; and a hydrotreating method using the catalyst.

BACKGROUND ART

In recent years, the need for low-sulfur fuel oil has ever been increasing for prevention of environmental pollution. On the other hand, as crude oil has become heavy globally, there is a tendency that crude oil having a high content of sulfur, asphaltene, metal and the like should be treated, and the conditions of hydrotreating atmospheric residual oil or vacuum residual oil to obtain low-sulfur fuel oil have been getting stricter. The prolonged demand structure involving a shortage of middle cuts is also a background of this tendency. As a result, improvements in activity and deactivation of a hydrotreating catalyst have been studied intensively, aiming at increase of production of low-sulfur fuel oil by hydrotreating heavy hydrocarbon oil.

Heavy hydrocarbon oil often contains metal compounds, mainly nickel, vanadium, and the like. If such heavy hydrocarbon oil is used as a raw material in a catalytic treatment step, these metal compounds deposit on the catalyst to diminish the catalyst activity and to shorten the catalyst life. Therefore, the metal content should be removed from the heavy hydrocarbon oil before catalytical treatments.

DISCLOSURE OF THE INVENTION

It is necessary for a catalyst having a high demetallization function to have a large pore size so as to treat metal-containing macromolecular components contained in heavy hydrocarbon oil and also to have a large pore volume so as to prohibit poisoning by the metal deposition.

However, there is a problem that an increased pore size or an increased pore volume of a catalyst results in weakness of catalyst strength.

Herein, SCS (side crushing strength) is expressed as an index of catalyst strength. It is generally accepted that a catalyst having SCS of 2 lb/mm or less is broken when used in an industrial reactor to cause the plugging of the catalyst bed.

An object of the present invention is to provide a hydrotreating catalyst which has improved strength and an extended life while having a great pore size and a great pore volume, and a hydrotreating process using the catalyst.

In order to accomplish the above object, the inventors of the present invention have conducted extensive investigation and found, as a result, that a catalyst having an average pore size of 19 nm or more and a pore volume of 0.65 g/ml or more and yet having a strength (SCS) of 3 lb/mm or more can be produced using an alumina carrier containing a specific amount of boron, and have also found that heavy hydrocarbon oil is demetallized with relative ease by hydrotreating in the presence of this catalyst and that the catalyst has an extended catalyst life. The present invention has been completed based on these findings.

That is, the above and other objects of the present invention have been accomplished by a hydrotreating catalyst composition for heavy hydrocarbon oil, which comprises a boron-containing alumina carrier containing 1 to 12 wt %, in terms of an oxide, of boron based on the catalyst, having supported thereon a metal in the Group VI, wherein the catalyst has an average pore size of 19 to 25 nm, a pore volume of 0.65 to 0.8 ml/g, a catalyst strength of 3 lb/mm or more, and a specific surface area of 70 to 130 m$^2$/g.

Furthermore, the above and other objects of the present invention have been accomplished by a method for preparing the above-described catalyst composition, which comprises gelatinizing an aqueous solution containing a raw material for alumina, mixing the resulting gel with boron to prepare a boron-containing alumina carrier, and supporting a metal in the Group VI on the boron-containing alumina carrier thus prepared.

Moreover, the above and other objects of the present invention have been accomplished by a method for hydrotreating heavy hydrocarbon oil, which comprises conducting a catalytic reaction of heavy hydrocarbon oil in the presence of the above-described catalyst composition at a temperature of 300 to 500° C., a pressure of 3 to 20 MPa, a hydrogen/oil ratio of 400 to 3000 Nl/l, and LHSV of 0.1 to 1.5 hr$^{-1}$.

The present invention will hereinafter be described in detail.

The hydrotreating catalyst composition for heavy hydrocarbon oil according to the present invention (hereinafter simply referred to as a hydrotreating catalyst of the invention) comprises, as a carrier, a boron-containing alumina carrier containing 1 to 12 wt %, in terms of an oxide, of boron based on the catalyst. Boron can exist either in the form of a simple substance or in the form of a compound. It is preferred that boron is well-dispersed in alumina.

The boron content is from 1 to 12 wt %, preferably from 2 to 10 wt %, in terms of an oxide based on the catalyst. If the boron content is less than 1 wt %, the catalyst strength cannot be increased. On the other hand, if the boron content is more than 12 wt %, the pore volume or surface area cannot be increased sufficiently.

The hydrotreating catalyst of the invention has a metal in the Group VI supported on the boron-containing alumina carrier. Examples of the Group VI metal includes Mo and W. Particularly, Mo is preferred. The Group VI metal may be present either in the form of a simple substance or in the form of a compound, such as a sulfide and the like. The Group VI metals can be used either alone or as a combination of two or more thereof.

The hydrotreating catalyst of the invention can have supported thereon other hydrogenation active metals in combination with the Group VI metal. Preferred examples of the hydrogenation active metals which can be supported in combination include the Group VIII metals, such as Ni, Co, Fe, and the like. These hydrogenation active metals to be supported in combination may be used either alone or as a combination of two or more thereof. Examples of the combination include molybdenum-nickel, molybdenum-cobalt, and tungsten-nickel. The molybdenum-nickel combination is preferably used.

While not particularly limited, the amount of the Group VI metal to be supported is preferably from 2 to 15 wt %, particularly 4 to 12 wt %, in terms of an oxide based on the catalyst. The amount of the hydrogenation active metals to be supported in combination is selected appropriately, and is usually from 0.001 to 4 wt %, preferably from 1 to 3 wt %, in terms of an oxide based on the catalyst. An increase of the hydrogenation active metal brings about an increase in hydrotreating activity, especially hydrodemetallizing activity, but tends to decrease the pore volume. On the other hand, a decrease of the active metal tends to result in a failure to obtain sufficient hydrotreating activity, especially hydrodemetallizing activity.

The average pore size of the hydrotreating catalyst of the invention is from 19 to 25 nm, preferably from 20 to 24 nm. If the average pore size is less than 19 nm, demetallizing activity cannot be obtained sufficiently. On the other hand, if the average pore size is more than 25 nm, the hydrotreating activity cannot be obtained sufficiently.

The pore volume of the hydrotreating catalyst of the invention is from 0.65 to 0.8 ml/g, preferably from 0.67 to 0.78 ml/g. If the pore volume is less than 0.65 ml/g, hydrotreating activity and a life cannot be obtained sufficiently. If the pore volume is more than 0.8 ml/g, the catalyst cannot be obtained sufficiently.

The catalyst strength of the hydrotreating catalyst of the invention is 3 lb/mm or more, preferably from 3 to 4.5 lb/mm, in terms of SCS. SCS, an index of the catalyst strength, is a crushing strength per unit length of a catalyst, which is obtained by applying a load on a horizontally placed catalyst, measuring the load at which the catalyst is crushed, and dividing the measured load by the length of the catalyst. If the SCS is less than 3 lb/mm, the catalyst should break in a reactor to be useless.

The hydrotreating catalyst of the invention has a specific surface area of 70 to 130 $m^2/g$, preferably 80 to 120 $m^2/g$, according to the BET method. If the specific surface area is less than 70 $m^2/g$, sufficient hydrotreating activity cannot be obtained. On the other hand, if it is more than 130 $m^2/g$, the average pore size reduces to lose the sufficient demetallizing activity.

Next, a suitable method for preparing the hydrotreating catalyst of the invention will be described.

A suitable method for preparing the hydrotreating catalyst of the invention include, for example, a process comprising gelatinizing an aqueous solution containing a raw material for alumina, aging the resulting gel under heating, washing the gel to remove impurities, controlling the water content in the gel, mixing the resulting alumina gel with a raw material for boron, treating the mixture in a usual manner, such as washing, aging under heating, primary drying, molding, secondary drying, and calcining, to prepare a boron-containing alumina carrier, and having a metal in the Group VI and, if desired, other active metals supported on the boron-containing alumina carrier thus prepared. One of some of such treatments as washing, aging under heating, primary drying, molding, secondary drying, and calcining may be omitted appropriately.

The boron-containing substances are not particularly limited as far as they contain boron. Examples of the boron-containing substances include boric acid ($H_3BO_3$), metaboric acid ($HBO_2$), and dimetaboric acid ($H_4B_2O_4$). Boric acid ($H_3BO_3$) is preferably used.

The raw materials for alumina are not particularly limited as far as they contain aluminum. Examples thereof include aluminum salts, such as aluminum sulfate, aluminum nitrate, and the like. These alumina raw materials are usually used as an aqueous solution. While not limited, the concentration is usually from 2 to 50 wt %, preferably from 5 to 40 wt %.

Gelation of an aqueous solution containing the raw material for alumina is carried out by neutralizing with a neutralizing agent, such as a base (e.g., ammonia), aluminic acid, sodium aluminate, or the like, or by mixing a precipitating agent, such as hexamethylenetetramine, calcium carbonate, or the like. While not limited, the amount of the neutralizing agent is usually from 30 to 70 wt % based on the total amount of the aqueous solution containing the raw material for alumina and the neutralizing agent. While not limited, the amount of the precipitating agent is usually from 30 to 70 wt % based on the total amount of the aqueous solution containing the raw material for alumina and the precipitating agent.

It is preferred for obtaining a hydrotreating catalyst with desired pore size and pore volume that the pH, the temperature, and the like be controlled while the neutralizing agent or precipitating agent is mixed for the gelation. In particular, the increase of a pH to an alkaline region during gel formation leads to preparation of a catalyst with large pore size and pore volume. Specifically a preferred pH range during gelation is from 4 to 8, and a preferred temperature during gelation is from 30 to 90° C.

The pore size and pore volume are also controllable with the aging condition under heating. Aging is preferably conducted for 5 hours or more. The longer the aging time, the larger the pore volume and average pore size and the sharper the pore distribution. The aging temperature is preferably from 80 to 95° C. A higher aging temperature makes the aging time shorter, but too high a temperature results in denaturation. The pH during the aging is preferably from 9 to 12. If the pH for the aging is less than 9, the aging is retarded. If the pH is more than 12, alumina undergoes unfavorable denaturation.

After the aging under heating, the alumina gel is treated with an aqueous acid solution in order to suppress aging-induced denaturation of the alumina gel. The aqueous acid solution which can be used here includes any kinds of inorganic acids except phosphoric acid and hydrofluoric acid, for example, nitric acid, hydrochloric acid, and sulfuric acid. Nitric acid is preferred. Hydrofluoric acid cannot be used because it can destroy the crystal structure of alumina.

The aqueous acid solution to be used preferably has a hydrogen ion concentration, pH, of 1 to 5.5, particularly 2 to 4. If the pH is less than 1, the alumina crystal structure will be destroyed by the acid. If the pH is 5.5 or more, it takes time for aging to cease.

In one of preferred modes for carrying out the treatment with an aqueous acid solution, an aqueous nitric acid solution is added to alumina gel to adjust to pH 2 to 3, and the mixture is stirred thoroughly at from room temperature (about 20° C.) to 60° C. to complete aging.

After completion of the treatment with an aqueous acid solution, an aqueous alkali solution is added to the alumina gel to maintain the pH from 9 to 13, preferably from 10 to 12. An aqueous ammonia solution is preferred as the aqueous alkali solution to be used.

The alumina gel having a pH adjusted with the aqueous alkali solution is then filtered or dried, and the water content of the resulting alumina gel is controlled. The water content can be controlled by drying, addition of water, and the like. Water content control is conducted in order to facilitate molding into a catalyst. The water content is preferably adjusted to from 60 to 95 wt %. The microfine surface structure of alumina can be controlled by altering the temperature and method of primary drying for water content control. For producing the hydrotreating catalyst of the invention, it is preferred that the temperature of the primary drying be less than 100° C. It is preferred in some cases that the alumina gel be dried through filtration with no or minimum heat applied, thereby to obtain a hydrotreating catalyst with enhanced demetallizing performance.

Then alumina gel with a controlled water content is mixed well with a boron-containing substance. The amount of the boron-containing substance is preferably from 1 to 12 wt % in terms of a boron oxide based on the finished catalyst. If the amount is less than 1 wt %, the catalyst strength cannot be increased sufficiently. If the amount is more than 12 wt %, the pore volume or surface area cannot be increased sufficiently.

The mixture of the boron-containing substance and alumina gel is then molded. Molding can be conducted by various molding methods, such as extrusion, press molding, and the like.

The molded boron-containing alumina catalyst is subjected to secondary drying and calcination. Secondary drying is preferably carried out at from room temperature (about 20° C.) to about 150° C., particularly from 100 to 120° C., for a period of about 2 hours or longer, particularly from 3 to 11 hours. The calcination is preferably conducted at 600° C. or more, particularly from 700 to 900° C., for about 1 hour or more, particularly from 2 to 4 hours.

The Group VI metal and, if desired, other hydrogenation active metal can be supported on the thus prepared boron-containing alumina carrier in a conventional manner. For example, the boron-containing alumina carrier is brought into contact with a solution containing a hydrogenation active metal component to have the active component supported thereon. This is carried out by, for example, immersing the boron-containing alumina carrier in a solution containing a hydrogenation active metal component to let the hydrogenation active metal component to precipitate. When several hydrogenation active metals are to be supported, the order to be supported is not limited.

The boron-containing alumina carrier having supported thereon the hydrogenation active metal is subsequently dried and calcined. The drying is preferably conducted at from room temperature (about 20° C.) to about 150° C., particularly from 100 to 120° C., for about 2 hours or more, particularly from 3 to 12 hours. The calcination is preferably performed at 350 to 600° C., particularly from 400 to 550° C., for about 2 hours or more, particularly from 3 to 12 hours.

According to the above-mentioned suitable method for preparing the hydrotreating catalyst, incorporation of boron into alumina is conducted by adding the boron-containing substance to the alumina gel with a controlled water content. There are other possible methods, in which alumina and boron are co-precipitated to make boron-alumina gel or an alumina carrier is subjected to ion exchange or impregnation to obtain a boron-containing alumina carrier. In order to make the pore size larger or to enhance the improvement in strength, the above-described method comprising adding the boron-containing substance to the alumina gel with a controlled water content is preferred.

The hydrotreating catalyst of the invention is not particularly limited by shape and can have various shapes of general catalysts. Non-cylindrical shapes as a quarter-leaf shape are preferred. The catalyst diameter is usually 1/10 to 1/22 inch.

In applying the hydrotreating catalyst of the invention to actual processing, it can be used as mixed with a known catalyst or a known inorganic oxide carrier or combined with such a known catalyst or carrier in a multiple bed system.

It is preferred for the hydrotreating catalyst of the invention to be subjected to preliminary sulfurization before use in hydrotreating heavy hydrocarbon oil. Preliminary sulfurization is carried out by, for example, supplying the catalyst with hydrocarbon oil or a gaseous sulfide containing about 1 wt % or more of sulfur under high temperature and high pressure. By this preliminary sulfurization the hydrogenation active metal component becomes a sulfide for the most part. A part or the whole of the hydrogenation active metal component is also converted to a sulfide by the sulfur component of heavy hydrocarbon oil during hydrotreating.

The hydrotreating catalyst of the invention can be used as a catalyst for various kinds of reaction. Hydrotreating of heavy hydrocarbon oil is one of suitable reactions for the hydrotreating catalyst of the invention.

The method for hydrotreating heavy hydrocarbon oil comprises catalytic treatment of heavy hydrocarbon oil with hydrogen in the presence of the above-described hydrotreating catalyst. The conditions of the catalytic treatment of heavy hydrocarbon oil are selected appropriately. A suitable hydrotreating temperature is from 300 to 500° C., preferably from 350 to 450° C., and a suitable hydrogen/oil ratio in hydrotreating is from 400 to 3000 Nl/l, preferably from 500 to 1800 Nl/l. A suitable hydrotreating pressure in terms of hydrogen partial pressure is from 3 to 20 MPa, preferably from 8 to 17 MPa. Suitable LHSV (liquid hourly space velocity) in hydrotreating is from 0.1 to 1.5 $hr^{-1}$, preferably from 0.2 to 1.0 $hr^{-1}$. Depending basically on the desired degree of reaction and the like, proper hydrotreating conditions are decided accordingly.

Examples of the heavy hydrocarbon oils which can be used in the method for hydrotreating include crude oil, distillation fractions obtained from crude oil such as atmospheric residual oil, vacuum residual oil, and the like, visbreaking oil, tar sand oil, and shale oil, and mixtures thereof.

The process conditions for hydrotreating are effective on heavy hydrocarbon oil containing 30 ppm or more, particularly 100 to 1500 ppm, of heavy metals, such as nickel, vanadium, and the like, heavy hydrocarbon oil containing 2 to 6 wt %, particularly 3 to 5.5 wt %, of sulfur, and heavy hydrocarbon oil containing 2 wt % or more, particularly 4 to 15 wt %, of asphaltene.

The term "hydrotreating of heavy hydrocarbon oil" as used herein means a contact treatment of heavy hydrocarbon oil with hydrogen and includes hydrofining under relatively less severe reaction conditions, hydrofining under relatively severe reaction conditions accompanying slight cracking, hydrosulfide isomerization, hydrodealkylation, demetallization (removal of metal content from heavy hydrocarbon oil), and other reactions of heavy hydrocarbon oil in the presence of hydrogen. Examples include hydrodesulfurization, hydrodenitrogenation, and hydrocracking of atmospheric residual oil or vacuum residual oil, and hydrofining of waxes or lubricant fractions.

Apparatus for carrying out hydrotreating on a commercial scale comprises an appropriate reactor in which a particulate hydrotreating catalyst is used in a fixed bed, a moving bed or a fluidized bed, to which oil to be processed is introduced and processed under high temperature and high pressure conditions and under a corresponding hydrogen partial pressure. Most generally, hydrotreating is carried out by making oil to flow down through a fixed bed of the hydrotreating catalyst. The hydrotreating catalyst can be used either in a single reactor or several reactors connected in series. It is particularly preferred to use a multi-stage reactor.

BEST MODE FOR CARRYING OUT THE INVENTION

Figure 1:
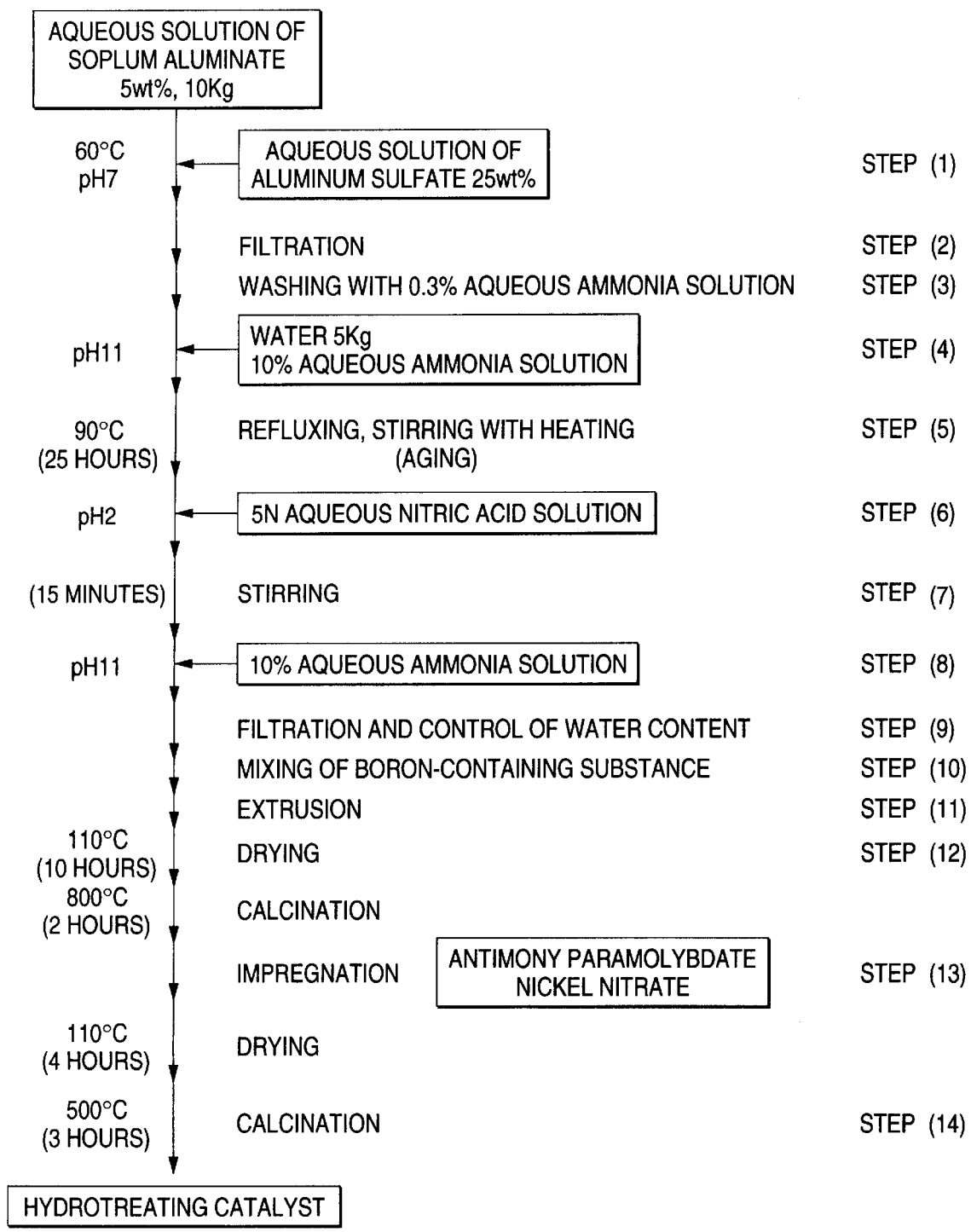
FIG. 1 is a flow chart illustrating an example of the process for producing the hydrotreating catalyst of the invention.

The present invention will now be illustrated more specifically by way of Examples, but the present invention is not construed as being limited thereto.

EXAMPLE 1
Preparation of Hydrotreating Catalyst A

A hydrotreating catalyst was prepared in accordance with the steps shown in FIG. 1. First of all, 10 kg of a 5 wt % aqueous sodium aluminate solution was heated to 60° C. To the aqueous sodium aluminate solution kept at 60° C., was added 2.8 kg of a 25 wt % aqueous aluminum sulfate solution to adjust to pH 7 to be gelatinized (step (1)). The resulting mixture was filtered (step (2)). The gel collected by filtration was washed with a 0.3 wt % aqueous ammonia solution (step (3)). Water (5 kg) was added to the gel, and a 10 wt % aqueous ammonia solution was further added to the aqueous dispersion of the gel to adjust to pH 11 (step (4)). The aqueous dispersion of the gel was heat-refluxed at 90° C. while stirring for 25 hours for aging (step (5)). Thereafter, the aqueous dispersion of the gel was adjusted to pH 2 by addition of a 5 N aqueous nitric acid solution (step (6)), followed by stirring for 15 minutes (step (7)). The aqueous dispersion of the gel was then adjusted to pH 11 by adding a 10 wt % aqueous ammonia solution (step (8)). The resulting aqueous dispersion of the gel was filtered, and water was added to the filtered alumina cake at room temperature (about 20° C.) to control the water content to give a viscosity practical for molding (step (9)). The water content of the alumina cake after the control was 70 wt %. Subsequently, boric acid as a boron-containing substance was added thereto in an amount of 8 wt % in terms of an oxide based on the catalyst, followed by kneading well (step (10)).

The resulting boron-containing alumina cake was extrusion molded (step (11)), dried at 110° C. for 10 hours (step (12)), and calcined at 800° C. for 2 hours. The calcined boron-containing alumina carrier (100 g) was put in an impregnating solution consisting of 100 g of water having dissolved therein antimony paramolybdate and nickel nitrate in concentrations of 9 wt % and 2 wt %, respectively, in terms of the respective oxides (step (13)). The impregnated boron-containing alumina carrier was heated at 110° C. for 4 hours to dry the impregnating water and then calcined at 500° C. for 3 hours (step (14)) to prepare hydrotreating catalyst A.

The steps (5) to (8) were repeated 3 times. Hydrotreating catalyst A was found to have a boron content of 8 wt % in terms of an oxide based on the hydrotreating catalyst and, as hydrogenation active metal contents, a molybdenum content of 9 wt % and a nickel content of 2 wt %, in terms of the respective oxides, based on the hydrotreating catalyst. The resulting hydrotreating catalyst had a quarter-leaf shape of 1/20 inch in diameter.

EXAMPLE 2
Preparation of Hydrotreating Catalyst B

Hydrotreating catalyst B was prepared in the same manner as in Example 1, except that the boron-containing substance was added in such an amount that the resulting hydrotreating catalyst had a boron content of 2 wt % in terms of an oxide.

EXAMPLE 3
Preparation of Hydrotreating Catalyst C

Hydrotreating catalyst C was prepared in the same manner as in Example 1, except that the boron-containing substance was added in such an amount that the resulting hydrotreating catalyst had a boron content of 10 wt % in terms of an oxide.

EXAMPLE 4
Preparation of Hydrotreating Catalyst D

Hydrotreating catalyst D was prepared in the same manner as in Example 1, except that the aging time in step (5) was changed to 30 hours and that the steps from (5) to (8) were repeated 4 times.

EXAMPLE 5
Preparation of Hydrotreating Catalyst E

Hydrotreating catalyst E was prepared in the same manner as in Example 1, except that the active metal species on the hydrotreating catalyst was only 9 wt %, in terms of an oxide, of molybdenum.

EXAMPLE 6
Preparation of Hydrotreating Catalyst F

Hydrotreating catalyst F was prepared in the same manner as in Example 1, except that the active metal species on the hydrotreating catalyst was only 9 wt %, in terms of an oxide, of tungsten, which was achieved by using antimony tungstate.

COMPARATIVE EXAMPLE 1
Preparation of Hydrotreating Catalyst M

Hydrotreating catalyst M was prepared in the same manner as in Example 1, except that boron was not added.

COMPARATIVE EXAMPLE 2
Preparation of Hydrotreating Catalyst N

Hydrotreating catalyst N was prepared in such a manner as to give increased strength without adding boron. Hydrotreating catalyst N was prepared in accordance with the process shown in FIG. 1, except for changing the aging time in step (5) to 15 hours and repeating the steps (5) to (8) twice. In step (13), the amounts of the active metals, molybdenum and nickel, on the hydrotreating catalyst were unchanged, i.e., 9 wt % and 2 wt %, respectively, in terms of the respective oxides.

COMPARATIVE EXAMPLE 3
Preparation of Hydrotreating Catalyst O

Hydrotreating catalyst O was prepared in the same manner as in Example 1, except for adding boron to give a boron content of 18 wt % in terms of an oxide based on the hydrotreating catalyst.

Analysis on Hydrotreating Catalyst

The properties of the hydrotreating catalysts A to F and M to O prepared above are shown in Tables 1 and 2 below.

(1) Pore volume was measured with a mercury porosimeter under a pressure of 4225 kg/cm$^2$.

(2) Average pore size was obtained from the relationship between the pressure in a mercury porosimeter under 0 to 4225 kg/cm$^2$ and the amount of mercury infiltrated into the hydrotreating catalyst (contact angle: 130°; surface tension: 470 dyne/cm)

(3) SCS of the hydrotreating catalyst was measured on samples obtained after calcination at 550° C. A load was applied at a rate of 10 kg/8.6 sec, and the load under which the catalyst was broken was measured. The measured load was divided by the length of the sample to obtain SCS.

TABLE 1

| | Example No. | | | | | |
|---|---|---|---|---|---|---|
| | 1 | 2 | 3 | 4 | 5 | 6 |
| Hydrotreating Catalyst | A | B | C | D | E | F |
| Active Metal Species | Ni, Mo | Ni, Mo | Ni, Mo | Ni, Mo | Mo | W |
| Active Metal Content (wt %) | 2, 9 | 2, 9 | 2, 9 | 2, 9 | 9 | 9 |
| $B_2O_3$ (wt %) | 8 | 2 | 10 | 8 | 8 | 8 |
| Average Pore size (nm) | 21.0 | 21.2 | 20.9 | 24.0 | 20.0 | 19.8 |
| Pore Volume (g/ml) | 0.67 | 0.69 | 0.65 | 0.72 | 0.69 | 0.70 |
| Strength (lb/mm) | 3.5 | 3.0 | 3.9 | 3.2 | 3.5 | 3.5 |
| Specific Surface Area ($m^2$/g) | 100 | 115 | 90 | 85 | 110 | 115 |

Note: The active metal content is in terms of an oxide.

TABLE 2

| | Comp. Ex. No. | | |
|---|---|---|---|
| | 1 | 2 | 3 |
| Hydrotreating Catalyst | M | N | O |
| Active Metal Species | Ni, Mo | Ni, Mo | Ni, Mo |
| Active Metal Content (wt %) | 2, 9 | 2, 9 | 2, 9 |
| $B_2O_3$ (wt %) | 0 | 0 | 18 |
| Average Pore size (nm) | 21.0 | 10.7 | 21.2 |
| Pore Volume (g/ml) | 0.68 | 0.66 | 0.57 |
| Strength (lb/mm) | 1.8 | 3.2 | 3.9 |
| Specific Surface Area ($m^2$/g) | 105 | 210 | 70 |

Note: The active metal content is in terms of an oxide.

EXAMPLES 7 TO 12

Reaction 1 Using Hydrotreating Catalyst

A 200 ml-volume shaking autoclave was packed with 100 g of Kwait vacuum distillation residual oil (nickel content: 44 ppm; vanadium content: 150 ppm; sulfur content: 5.1 wt %; asphaltene content: 9.0 wt %) and 20 g of one of hydrotreating catalysts A to F. The inner atmosphere was displaced with hydrogen, and the temperature was elevated to 410° C. Hydrogen was pressed in the autoclave to 15 MPa, and reaction was conducted for 3 hours at a shaking speed of 60 strokes per minute. The results obtained are shown in Table 3.

COMPARATIVE EXAMPLES 4 TO 6

Hydrotreating of heavy hydrocarbon oil was carried out in the same manner as in Examples 7 to 12, except for using hydrotreating catalysts M to 0 in place of hydrotreating catalysts A to F. The results obtained are shown in Table 4.

TABLE 3

| | Example No. | | | | | |
|---|---|---|---|---|---|---|
| | 7 | 8 | 9 | 10 | 11 | 12 |
| Hydrotreating Catalyst | A | B | C | D | E | F |
| Hydrodemetallization Ratio (%) | 86 | 84 | 84 | 92 | 82 | 80 |

TABLE 4

| | Comp. Ex. No. | | |
|---|---|---|---|
| | 4 | 5 | 6 |
| Hydrotreating Catalyst | M | N | O |
| Hydrodemetallization Ratio (%) | 86 | 48 | 70 |

EXAMPLES 13 TO 18

Reaction 2 Using Hydrotreating Catalyst

A fixed bed flow type microreactor was packed with 20 ml of one of hydrotreating catalysts A to F. After preliminary sulfurization, Boscan crude oil (nickel content: 130 ppm; vanadium content: 1250 ppm; sulfur content: 4.5 wt %; asphaltene content: 13.2 wt %) was continuously passed through the catalyst bed under conditions of 395° C. in reaction temperature, 10 MPa in hydrogen partial pressure; 0.5 $hr^{-1}$ in LHSV, and 1780 Nl/l in hydrogen/oil ratio. The reaction results are shown in Table 5 below. In Table 5, "hydrodemetallization ratio" is one measured on the 10th day of running, and "running time" is the time (days) at which the hydrodemetallization ratio dropped to 60% or less.

COMPARATIVE EXAMPLES 7 TO 9

Hydrotreating of heavy hydrocarbon oil was carried out in the same manner as in Examples 13 to 18, except for using hydrotreating catalysts M to O instead of hydrotreating catalysts A to F. The results obtained are shown in Table 6.

TABLE 5

| | Example No. | | | | | |
|---|---|---|---|---|---|---|
| | 13 | 14 | 15 | 16 | 17 | 18 |
| Hydrotreating Catalyst | A | B | C | D | E | F |
| Hydrodemetallization Ratio (%) | 86 | 84 | 84 | 92 | 82 | 80 |
| Running Time (days) | 60 | 63 | 60 | 68 | 60 | 61 |

TABLE 6

| | Comp. Ex. No. | | |
|---|---|---|---|
| | 7 | 8 | 9 |
| Hydrotreating Catalyst | M | N | O |
| Hydrodemetallization Ratio (%) | 86 | 48 | 70 |
| Running Time (days) | 63 | 40 | 45 |

As can be seen from the results shown in Tables 1 through 6, the present invention provides a hydrotreating catalyst which has a large pore size and a large pore volume while retaining high strength. Use of the hydrotreating catalyst of the invention makes it possible to easily remove most of the heavy metal content of heavy hydrocarbon oil.

INDUSTRIAL APPLICABILITY

The hydrotreating catalyst of the invention has high strength, excellent catalyst activity, and has a long catalyst life. Application of the hydrotreating catalyst of the invention to hydrotreating of heavy hydrocarbon oil achieves an efficient catalytic reaction.

What is claimed is:

1. A hydrotreating catalyst composition for heavy hydrocarbon oil, which comprises a boron-containing alumina carrier containing from 1 to 12 wt %, in terms of an oxide, of boron based on the catalyst, having supported thereon a metal in the Group VI, wherein the catalyst has an average pore size of from 19 to 25 nm, a pore volume of from 0.65 to 0.8 ml/g, a catalyst strength of 3 lb/mm or more, and a specific surface area of from 70 to 130 $m^2/g$.

2. The catalyst composition according to claim 1, wherein the boron-containing alumina carrier has been calcined at 600° C. or more after being molded.

3. A method for preparation of the catalyst composition according to claim 1 or 2, which comprises gelatinizing an aqueous solution containing a raw material for alumina, mixing the resulting gel with boron to prepare a boron-containing alumina carrier, and supporting a metal in the Group VI on the boron-containing alumina carrier thus prepared.

4. The method according to claim 3, which further comprising molding the boron-containing alumina carrier, and then calcining the molded carrier at 600° C. or more.

5. A process for hydrotreating heavy hydrocarbon oil, which comprises conducting a catalytic reaction of heavy hydrocarbon oil in the presence of the catalyst composition according to claim 1 or 2 at a temperature of from 300 to 500° C., a pressure of from 3 to 20 MPa, a hydrogen/oil ratio of from 400 to 3000 Nl/l, and LHSV of from 0.1 to 1.5 $hr^{-1}$.

* * * * *